United States Patent
Letscher et al.

(10) Patent No.: US 11,558,992 B2
(45) Date of Patent: Jan. 24, 2023

(54) COUPLING DEVICE FOR A POWER LIFT

(71) Applicant: DEERE & COMPANY, Moline, IL (US)

(72) Inventors: Jens Letscher, Albessen (DE); Florian Reinmuth, Sinsheim (DE)

(73) Assignee: DEERE & COMPANY, Moline, IL (US)

( * ) Notice: Subject to any disclaimer, the term of this patent is extended or adjusted under 35 U.S.C. 154(b) by 481 days.

(21) Appl. No.: 16/857,926

(22) Filed: Apr. 24, 2020

(65) Prior Publication Data
US 2020/0352084 A1   Nov. 12, 2020

(30) Foreign Application Priority Data
May 7, 2019   (DE) .......................... 102019003207.1

(51) Int. Cl.
*A01B 59/06* (2006.01)
*A01B 71/02* (2006.01)
(Continued)

(52) U.S. Cl.
CPC ............ *A01B 71/02* (2013.01); *A01B 59/066* (2013.01); *A01B 63/023* (2013.01); *A01B 63/1013* (2013.01); *A01B 63/111* (2013.01); *B60D 1/36* (2013.01); *A01B 69/001* (2013.01); *B60D 2001/008* (2013.01)

(58) Field of Classification Search
CPC . A01B 63/023; A01B 63/1013; A01B 63/111; A01B 63/12; A01B 71/02; A01B 59/042; A01B 59/062; A01B 59/065; A01B 59/066; A01B 69/001; B60D 1/36
See application file for complete search history.

(56) References Cited

U.S. PATENT DOCUMENTS

| | | | | |
|---|---|---|---|---|
| 2,742,842 A | * | 4/1956 | Johnson | A01B 59/065 172/450 |
| 3,489,431 A | * | 1/1970 | Beckwith | A01B 59/066 172/450 |

(Continued)

FOREIGN PATENT DOCUMENTS

| | | |
|---|---|---|
| DE | 2358081 A1 | 5/1974 |
| DE | 102015224757 A1 | 6/2017 |

(Continued)

OTHER PUBLICATIONS

Letscher et. al., Method for Controlling the Operation of an Attachment, unpublished U.S. Appl. No. 16/837,410, filed Apr. 1, 2020, 26 pages.

(Continued)

*Primary Examiner* — Gary S Hartmann

(57) ABSTRACT

A coupling device for attaching a power lift of a tractor to an attachment includes a link mounting region having coupling units for the articulation of an upper link and two lower links of the power lift, and an apparatus mounting region for fixing the attachment. A coupling unit assigned to the upper link is movable in a translatory manner in a vertical direction running perpendicular to a transverse direction. The coupling units are movably disposed on a device base of the coupling device, and the coupling units assigned to the two lower links are movable in a translatory manner in the transverse direction.

20 Claims, 5 Drawing Sheets

(51) Int. Cl.
*A01B 63/10* (2006.01)
*A01B 63/111* (2006.01)
B60D 1/36 (2006.01)
*A01B 63/02* (2006.01)
*A01B 69/00* (2006.01)
*B60D 1/00* (2006.01)

(56) References Cited

U.S. PATENT DOCUMENTS

| | | | | |
|---|---|---|---|---|
| 3,858,663 A * | 1/1975 | Lurwig, Jr. | ............ | E02F 3/7627 |
| | | | | 280/468 |
| 4,125,271 A * | 11/1978 | Wiboltt | ................ | A01B 59/068 |
| | | | | 172/449 |
| 4,236,724 A * | 12/1980 | Schillings | ............ | A01B 59/041 |
| | | | | 172/450 |
| 4,283,071 A * | 8/1981 | Pedersen | .............. | A01B 59/042 |
| | | | | 172/449 |
| 4,862,971 A * | 9/1989 | Azzarello | ............ | A01B 59/041 |
| | | | | 172/450 |
| 5,361,850 A * | 11/1994 | Muller | ................ | A01B 59/041 |
| | | | | 172/450 |
| 6,203,047 B1 * | 3/2001 | Adamek | ............ | A01B 59/0415 |
| | | | | 172/450 |
| 6,386,571 B1 * | 5/2002 | Vollmer | ............. | A01B 59/0415 |
| | | | | 172/450 |
| 8,328,222 B1 * | 12/2012 | Roeber | .................. | B60D 1/247 |
| | | | | 280/406.1 |
| 9,555,813 B2 | 1/2017 | Strano | | |
| 11,388,852 B2 * | 7/2022 | Kremmer | ............. | A01B 69/004 |
| 2020/0324594 A1 | 10/2020 | Letscher et al. | | |

FOREIGN PATENT DOCUMENTS

| | | |
|---|---|---|
| DE | 102016117237 A1 | 3/2018 |
| EP | 2283719 A2 | 2/2011 |
| EP | 3259970 A1 | 12/2017 |
| EP | 3453236 A1 | 3/2019 |

OTHER PUBLICATIONS

European Search Report issued in counterpart application No. 20172764.1 dated Oct. 2, 2020 (07 pages).

* cited by examiner

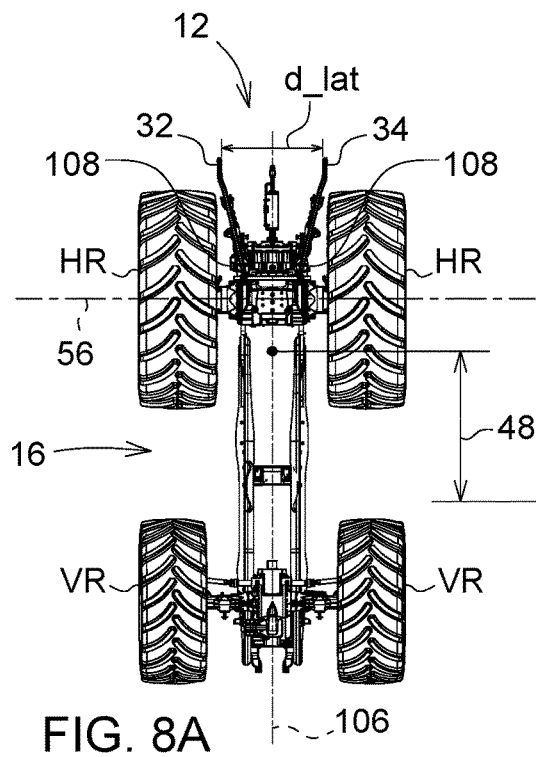
FIG. 8A
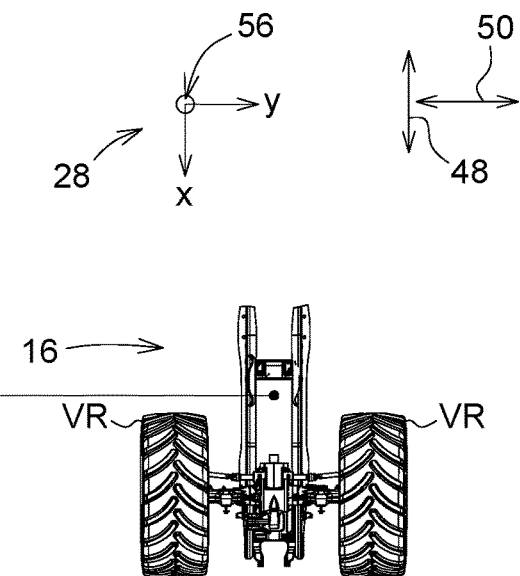
FIG. 8B
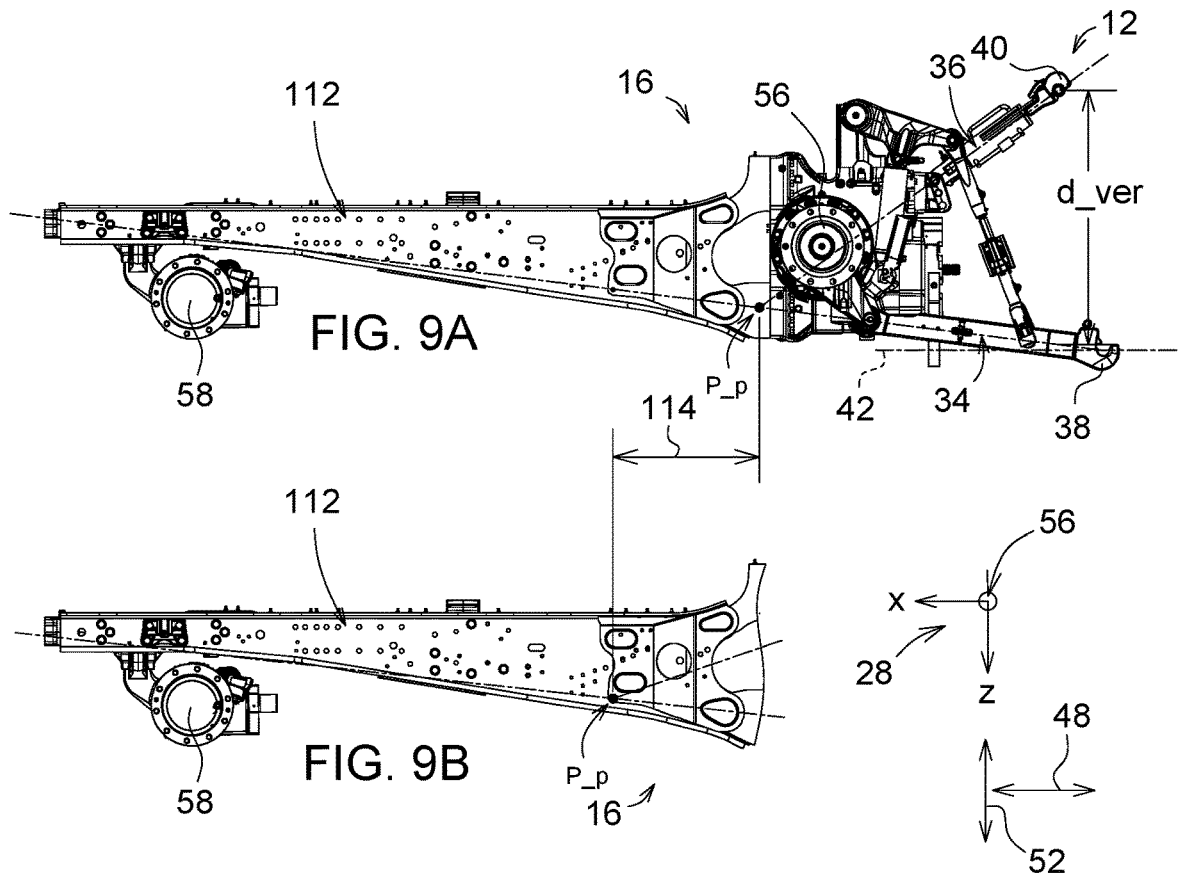
FIG. 9A
FIG. 9B

COUPLING DEVICE FOR A POWER LIFT

RELATED APPLICATIONS

This application claims priority to German Patent Application Ser. No. 102019003207.1, filed May 7, 2019, the disclosure of which is hereby incorporated by reference in its entirety.

FIELD OF THE DISCLOSURE

The present disclosure relates to a coupling device for attaching a power lift of a tractor to an attachment.

BACKGROUND

In DE 10 2015 224 757 A1, a device is provided on a tractor in order to determine the vertical position of an attachment in the form of a plow pulled by the tractor. In the case of deviation from a reference vertical position, a hydraulic actuating unit is activated in order to pivot the plow.

There is a need, however, for an efficient operation of an attachment by a simple technical manner.

SUMMARY

In the present disclosure, a coupling device serves for attaching a power lift of a tractor to an attachment. The coupling device comprises a link mounting region and an apparatus mounting region. The link mounting region has coupling units for the articulation of an upper link and two lower links of the power lift. The apparatus mounting region serves for fixing the attachment. The coupling units are movably borne on a device base of the coupling device. In this case, the coupling units assigned to the two lower links are movable in a translatory manner in a transverse direction, while a coupling unit assigned to the upper link is movable in a translatory manner in a vertical direction running perpendicular to the transverse direction.

The coupling device acts to a certain extent as a mounting interface interposed between the power lift and the attachment. Thus, a technical mechanism (for example, hydraulic or electric drive units) for controlling the movement of the upper link and the lower links may be arranged on the coupling device. As a result, for an accurate control of the movement of the upper link and the lower links, a corresponding technical mechanism may be dispensed with on the supporting structure of the tractor. The coupling device may be used in a flexible manner for different types of tractors or the supporting structures thereof, without the tractors or the supporting structures thereof having to be adapted in a complex manner by technical means.

The fixing of the respective attachment to the apparatus mounting region of the coupling device may be carried out by various fixing mechanisms. For example, arresting hooks or other fastening points are arranged on the apparatus mounting region in order to achieve a direct or indirect mechanical connection with corresponding fixing points of the attachment. Further, for example, link-type, connecting pieces may also be provided between individual fixing mechanisms of the coupling device and corresponding fixing points of the attachment. In each case, irrespective of the embodiment of the fixing of the attachment to the apparatus mounting region, the fixing effects, in particular, a substantially rigid and releasable connection between the coupling device and the attachment.

The aforementioned transverse direction is identical to a horizontal transverse direction of the tractor, while the aforementioned vertical direction is identical to a vertical direction of the tractor along a vertical line. Due to the movable bearing of the coupling units, the coupling device may be used, in particular, for adjusting, in a geometrically accurate manner, the position of a point of action which may be selected from at least the following geometric points: (a) a point of traction as the geometric point of intersection of the imaginary extensions of both lower links, and (b) a pole point as the geometric point of intersection of the imaginary extensions of the upper link and one or both lower links.

By the aforementioned adjustment of the position of the point of action an optimization of the selected point of action may be achieved for the respective use of the attachment. Thus, the operation of the attachment is more efficient with less technical effort, whether by an optimization on the part of the driver or user or by an automated optimization. This reduces the fuel consumption of the tractor and saves operating time. At the same time, a high-quality operation of the attachment is facilitated. Moreover, the optimization of the selected point of action acts as an assistance function for the driver or user, so that significant pressure is taken off the driver or user before and during operation. As a whole, this results in greater productivity with lower operating costs.

Starting from the determined position, an adjustment of the point of action may be used in a technically simple manner to achieve in a targeted manner operating properties of the tractor or the attachment which are desired by the driver or user.

For example, during use (such as in the case of plowing, changing characteristics of the soil and topography, such as a sloping site), undesired yawing and the corresponding necessary steering actions by the driver may be avoided by the position of the point of traction being optimized. With a further adjustment of the point of traction, for example, a defined lateral pulling of the attachment relative to a furrow wall may also be implemented during plowing.

With an adjustment of the pole point, a tractor-attachment combination may also be assisted during operation, for example, during soil treatment, pulling operations or even in the case of a power take-off shaft drive. Depending on the attachment used, a positioning of the pole point in the direction of travel just downstream of the front axle of the tractor may lead to correct loading of the front axle and to a smooth performance below the surface of the soil. The position of the pole point may be adjusted such that the attachment may be retracted easily with a small expenditure of force. For a particularly effective re-compaction by the guide rollers of various attachments (for example, a cultivator, disk harrow) the pole point may be adjusted in the direction of travel upstream of the front axle of the tractor.

The mobility of the coupling units assigned to the lower links is configured such that these coupling units are movable relative to one another in order to alter a relative spacing running in the transverse direction. In this case, if required these two coupling units are moved toward one another or away from one another. As a result, an adjustment of the point of traction which is as geometrically accurate as possible is facilitated. Additionally, the mobility of these two coupling units may also be designed such that the coupling units are moved in the same direction simultaneously and, in particular, without altering the relative spacing, so that the coupling device achieves a lateral offset between the tractor and the attachment (for example, a hoe). This is desired, for example, in order to permit the attachment to travel laterally adjacent to a plant row and in order to avoid any resulting damage to plants.

In one embodiment, the coupling units assigned to the lower links are movable independently of one another. As a result, the options for adjusting the power lift are increased and an efficient use of the attachment is correspondingly facilitated. In particular, an even greater number of possible spatial points are produced in order to optimize the position of the point of traction.

In a further embodiment, the coupling unit assigned to the upper link and the coupling units assigned to the lower links are movable independently of one another. As a result, the coupling device facilitates a flexible adjustability of the power lift and thus also an efficient operation of the attachment.

The coupling device has at least one drive unit which is connected to at least one coupling unit. A suitable activation of the drive unit (for example, by hydraulic or electric control signals) facilitates a defined translatory movement of the respective coupling unit and thus an accurate adjustment of the power lift.

In another embodiment of the coupling device, the coupling units assigned to the two lower links are connected to the same drive unit. As a result, the control of the movement of the lower links may be provided in a particularly cost-effective and space-saving manner.

The aforementioned connection between a drive unit (for example, hydraulic cylinder or electric motor) and one or more coupling units may be designed differently according to different requirements (for example, efficiency in terms of force transmission, defined spatial conditions, costs). The connection between a drive unit and the assigned coupling unit(s) is configured in the manner of a movable lever structure or a kinematic chain.

Irrespective of a specific embodiment, the coupling device is a component of a control arrangement for controlling the movement of a power lift of a tractor, in particular the upper link thereof and the lower links thereof.

The individual functionalities of the control arrangement may be arranged physically distributed on the tractor, the power lift, the coupling device, or the attachment. Depending on the model or type of tractor, therefore, in each case the most advantageous technical embodiment of the control arrangement may be defined and implemented.

In particular, the control arrangement has a control unit which contains the sub-units required for signal processing, such as a reading unit or writing unit, memory unit or processor. The control unit may have sub-units (for example, on the tractor and on the coupling device) which are physically separate from one another or may be arranged as a single unit on the tractor.

By the control unit, the force lift may be controlled in terms of movement in a technically simple manner, by the control unit generating adjustment signals. These adjustment signals may serve for setting the upper link and the lower links of the power lift. In particular, a target spacing may be set between the upper link and a lower link or a target spacing may be set between two lower links.

For a technically simple implementation of the adjustment signals as a control of the movement of the power lift, at least one drive unit of the coupling device is activated by the adjustment signals. For example, the drive unit may be a hydraulic cylinder which is activated by a control valve. The control valve in turn receives the aforementioned adjustment signals. The control valves which are used are arranged in one embodiment on the coupling device, whereby a larger number of hydraulic plug-in points may be reserved on the tractor for other purposes. Alternatively, control valves which are present in any case on the tractor are used, whereby no control valves have to be taken into account on the coupling device, and the coupling device may be designed to be correspondingly more cost-effective and space-saving.

In a further embodiment, the adjustment signals are transmitted to an electric motor as a drive unit.

In order to assist a technically efficient mode of operation of the control arrangement, the control unit thereof is configured such that it generates adjustment signals as a function of a target predetermined value or a comparison between a target predetermined value and a current state (for example, sensor signals). In this case, for example, the determined current position of a point of action (in particular point of traction or pole point) may be automatically adjusted depending on the result of a comparison with a target predetermined value. The target predetermined value, for example, is a target position of the selected point of action. The target predetermined value, in particular, is compared with the current position within an algorithm. Depending on the result of the comparison, adjustment signals which activate the power lift or the two lower links thereof or the upper link thereof for the adjustment thereof, may be generated in the control unit. This adjustment of the power lift may thus effect an automatic implementation of a target predetermined value.

The aforementioned target predetermined value, for example, may be predetermined by the driver or user of the tractor via a user interface. Alternatively, the target predetermined value may be defined automatically by a control device on the tractor side or a bus system of the tractor.

For an efficient optimization strategy when adjusting the power lift or the upper link thereof or the lower links thereof, the functionality of the control unit is designed such that it initially receives sensor signals from an appropriate sensor unit. From the received sensor signals, the control unit may determine, among other things, a current position of the upper link, the lower links and also the aforementioned points of action (in particular, point of traction or pole point). The current position is determined in the form of coordinates x, y, z of a defined coordinate system. Depending on the received sensor signals and optionally also on the aforementioned target predetermined value, the control unit may generate the respective adjustment signals for an optimal adjustment of the power lift.

The aforementioned sensor unit is a component of the control arrangement. The sensor unit is configured such that, by its signals, current values of specific physical parameters (for example, reference angles relative to a reference line, lengths, acting forces) of individual components of the power lift such as the upper link, lower links, lateral stabilizer may be measured or determined. Among other things, a current position of the upper link and the lower links and thus also of the point of traction and the pole point may be determined therefrom.

The sensor unit may contain a plurality of different sensor mechanisms or devices, for example, an inertial sensor, inclination sensor, IMU, or optical sensor, such as one or more camera units. Depending on the arrangement of individual components of the sensor unit on the tractor or the power lift or the coupling device or the attachment, the sensor unit may be designed differently in terms of technology.

In another embodiment, the sensors of the sensor unit are already present on the tractor or on the power lift. In this case, the coupling device may be provided in a space-saving and cost-saving manner without further sensor means.

In an alternative embodiment, the sensor unit may be arranged at least partially, in particular fully, on the coupling device. The coupling device may also be used in a tractor-power lift combination which, while it has a control unit, it is not able to provide a suitable sensor unit for determining the current position of the upper link, the lower links and the points of action.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 8A and FIG. 8B show a plan view of a tractor with two different positions of the point of traction, and FIG. 9A and FIG. 9B shows a side view of the supporting structure of a tractor with two different positions of the pole point.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
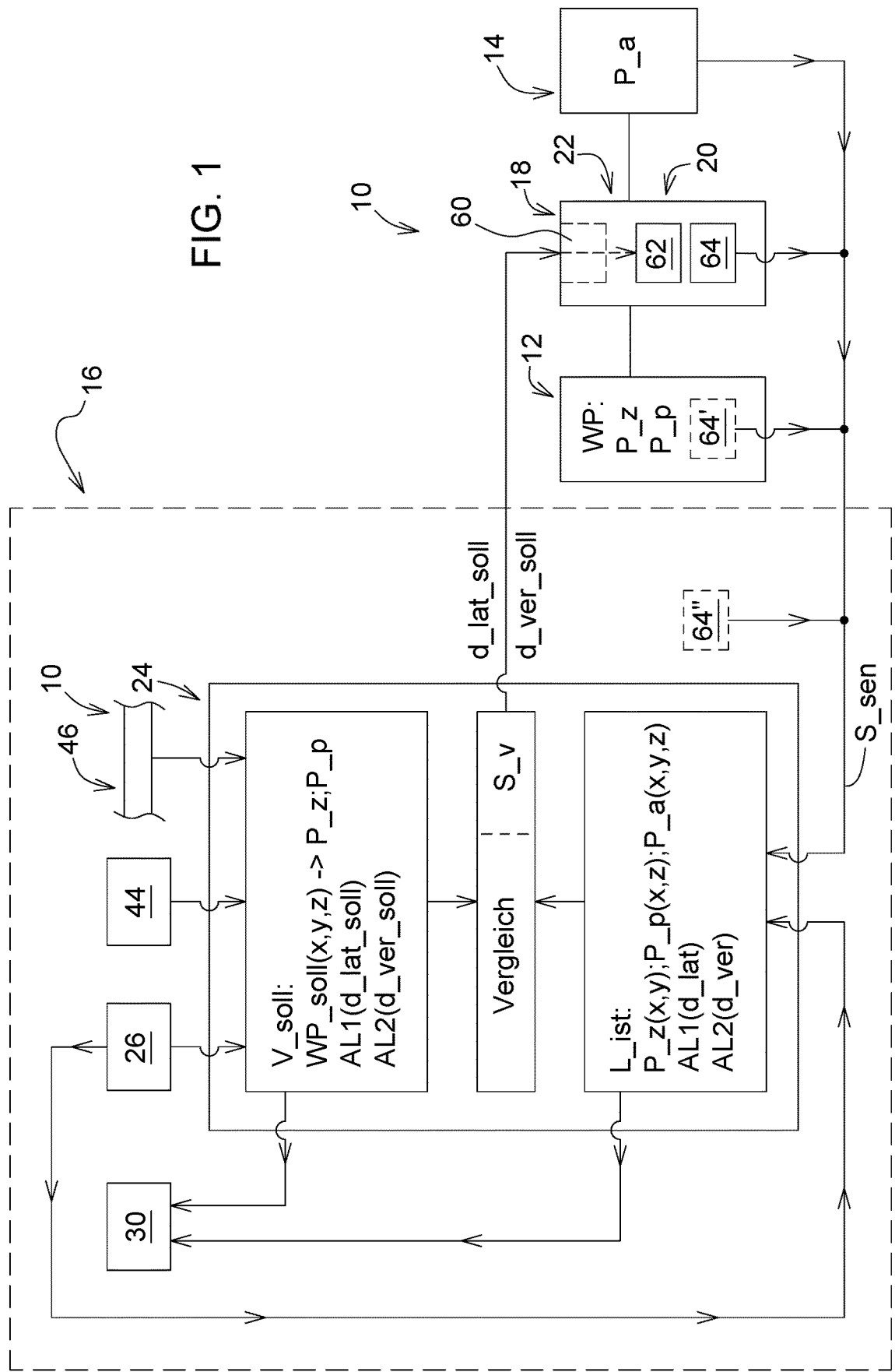
FIG. 1 shows a block diagram with a schematically shown control arrangement for controlling the movement of a power lift.

FIG. 1 shows a control arrangement 10 or system having a plurality of components for controlling the movement of a power lift 12 and thus also for controlling the operation of an attachment 14. The attachment 14 is coupled to a tractor 16 via the power lift 12. The control arrangement 10 in the embodiment according to FIG. 1 is partially arranged on the tractor 16 and on a coupling device 18. The coupling device 18 has a link mounting region 20 facing the power lift 12 and an apparatus mounting region 22 facing the attachment 14.

The control arrangement 10 has a control unit 24 which contains the sub-units required for signal processing such as, for example, a reading unit or writing unit, memory unit, processor. The control unit 24 may have sub-units which are physically separate from one another or may be arranged on the tractor 16 as a single unit.

Figure 2:
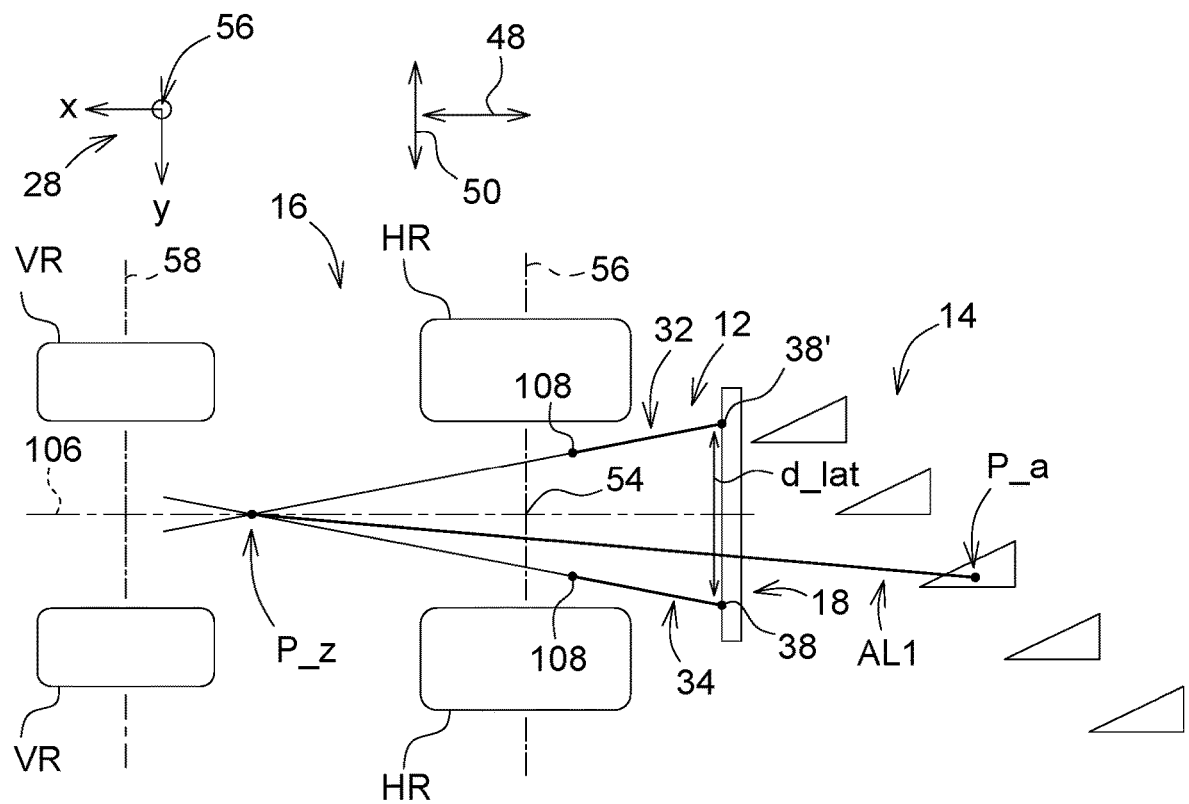
FIG. 2 shows a plan view of a schematically shown tractor-attachment combination.
Figure 3:
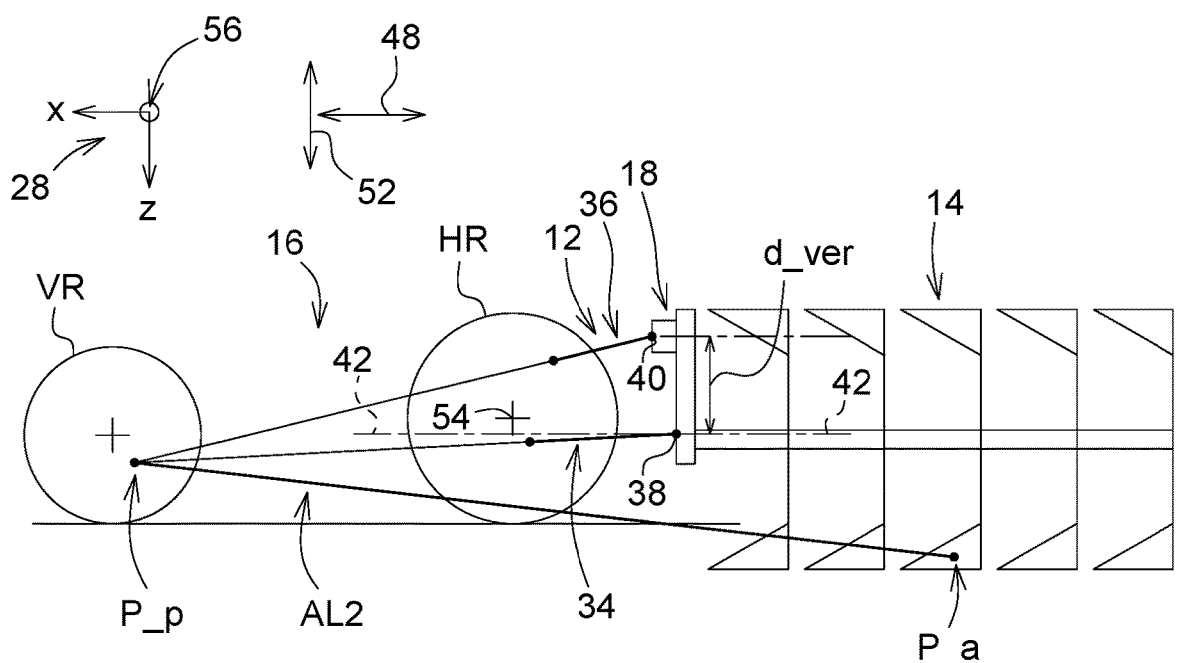
FIG. 3 shows a side view of the tractor-attachment combination according to FIG. 2.

The control unit 24 receives as data, for example, sensor signals S_sen from the power lift 12 or the coupling device 18 or the attachment 14 or data information of the driver or user via a user interface 26. From the data received, the control unit 24 determines, among other things, the current position L_ist of two points of action WP to be described further, namely a point of traction P_z and a pole point P_p. The current position L_ist is determined in the form of coordinates x, y, z of a defined coordinate system 28 (FIG. 2, FIG. 3). Moreover, the current position L_ist of an operating point P_a assigned to the attachment 14 may be determined.

Alternatively, the current position L_ist of the operating point P_a may be determined before or during use of the attachment 14, by specific geometric dimensions of the attachment 14, specific geometric spacing between the tractor 16 and the attachment 14, as well as specific spacing between the attachment 14 and the ground to be treated being measured by the driver or the user and transmitted to the control unit 24 via the user interface 26. From the transmitted data, the control unit 24 may then determine the current position L_ist of the operating point P_a.

The determined current position L_ist of the point of action WP, i.e. P_z or P_p, and of the operating point P_a may be signaled to the driver via a display unit 30 of the tractor 16. Additionally, the determined position L_ist of the point of action WP may be automatically adjusted depending on the result of a comparison with a target predetermined value V_soll. The target predetermined value V_soll is, for example, a target position WP_soll of the selected point of action WP or a target position of an operating line AL1 (FIG. 2) or AL2 (FIG. 3). The target predetermined value V_soll is compared within an algorithm with the current position L_ist. Depending on the result of the comparison, adjustment signals S_v may be generated in the control unit 24. These signals S_v serve to set a target spacing d_lat_soll between the two lower links 32, 34 of the power lift 12 or to set a target spacing d_ver_soll between an upper link 36 and a lower link 34 of the power lift 12.

Adjustment signals S_v are then transmitted, for example, from the control unit 24 when a current horizontal relative spacing d_lat between the two coupling points 38, 38' of the lower links 32, 34 facing the attachment 14 is designed to be replaced by the target spacing d_lat_soll. As a result, a current position L_ist of the point of traction P_z may be adjusted so that the point of traction P_z may adopt a target position WP_soll. Moreover, adjustment signals S_v are transmitted from the control unit 24 when a current vertical relative spacing d_ver between the coupling point 40 of the upper link 36 facing the attachment 14 and a reference line 42 is intended to be replaced by the target spacing d_ver_soll. As a result, a current position L_ist of the pole point P_p may be adjusted so that the pole point P_p may adopt a target position WP_soll. The reference line 42 runs, in particular, through the coupling point 38 or 38' of the lower link 34 or 32.

As already described, depending on the adjustment signals S_v the power lift 14 or the two lower links 32, 34 thereof or the upper link 36 thereof are activated for the adjustment thereof. This adjustment of the power lift 12 is thus able to effect an automatic implementation of a target predetermined value V_soll.

The target predetermined value V_soll may, for example, be predetermined by the driver or user via the user interface 26. Alternatively, the target predetermined value V_soll may be automatically defined via a control device 44 on the tractor side or a bus system 46 of the tractor 16. The respective target predetermined value V_soll may optionally be signaled to the display unit 30. The driver or user may thus identify in a simple manner target predetermined values and optionally alter said target predetermined values in a very accurate manner.

The view of the current positions L_ist and the target positions by the target predetermined value V_soll on the display unit 30 is similar to the view in FIG. 2 and FIG. 3, so that the user has a clear overview of the current position and alterations to the selected point of action WP, the operating point P_a and the operating lines AL1 and AL2.

For determining the point of action WP, the operating point P_a and the operating lines AL1, AL2 the aforementioned coordinate system 28, which may be clearly identified with reference to FIG. 2 and FIG. 3, is defined. The coordinate system 28 has an x-axis, a y axis and a z-axis. The x-axis runs parallel to a longitudinal direction 48 of the tractor 16, in particular a vehicle horizontal line. The y-axis runs parallel to a transverse direction 50 of the tractor 16, in particular a further vehicle horizontal line. The z-axis runs parallel to a vertical direction 52 of the tractor 16, in particular a vehicle vertical line. The three aforementioned axes intersect in a point of origin 54 or zero point which corresponds to a reference point for the position of the points of action WP, the operating point P_a and the operating lines AL1, AL2. As may be identified in FIG. 2 and FIG. 3, this reference point corresponds to a central point of a rear axle 56 of the tractor 16.

Moreover, it may be derived from FIG. 2 and FIG. 3 that during the use shown therein, the position both of the point of traction P_z and the pole point P_p in the longitudinal direction 48 is located between the rear axle 56 with two rear wheels HR and a front axle 58 with two front wheels VR of the tractor 16. While the first operating line AL1 connects the point of traction P_z to the operating point P_a (FIG. 2), the second operating line AL2 connects the pole point P_p to the operating point P_a (FIG. 3). The first operating line AL1 is located in a plane spanned by the longitudinal direction 48 and the transverse direction 50. The second operating line AL2 is located in a plane spanned by the longitudinal direction 48 and the vertical direction 52.

The point of traction P_z is the geometric point of intersection of the imaginary extensions of the two lower links 32, 34 (FIG. 2). The pole point P_p is the geometric point of intersection of the imaginary extensions of the upper link 36 and a lower link 32 or 34. The horizontal relative spacing d_lat runs parallel to the transverse direction 50. The vertical relative spacing d_ver runs parallel to the vertical direction 52.

A part 60 (for example an ISOBUS controller) of the control unit 24 may optionally be integrated on the coupling device 18, which is shown in FIG. 1 schematically by the block 60 shown in dashed lines. Irrespective of the embodiment of the control unit 24, one or more working units 62, to be described further, are activated by means of the adjustment signals S_v. The power lift 12 or its lower links 32, 34 and its upper link 36 are controlled in terms of movement by the drive unit(s) 62. Adjustment signals S_v may be transmitted as control signals directly to the drive unit 62 (for example, an electric motor). Alternatively, these control signals may be transmitted to a control component (for example, a hydraulic control valve 84) which activates the drive unit 62 (for example a hydraulic cylinder).

A sensor unit 64 emitting the sensor signals S_sen to the control unit 24 is also integrated in the coupling device 18. Alternatively or additionally, for generating sensor signals S_sen, a sensor unit 64' or 64" may be arranged on the power lift 12 or on the tractor 16.

Figure 4:
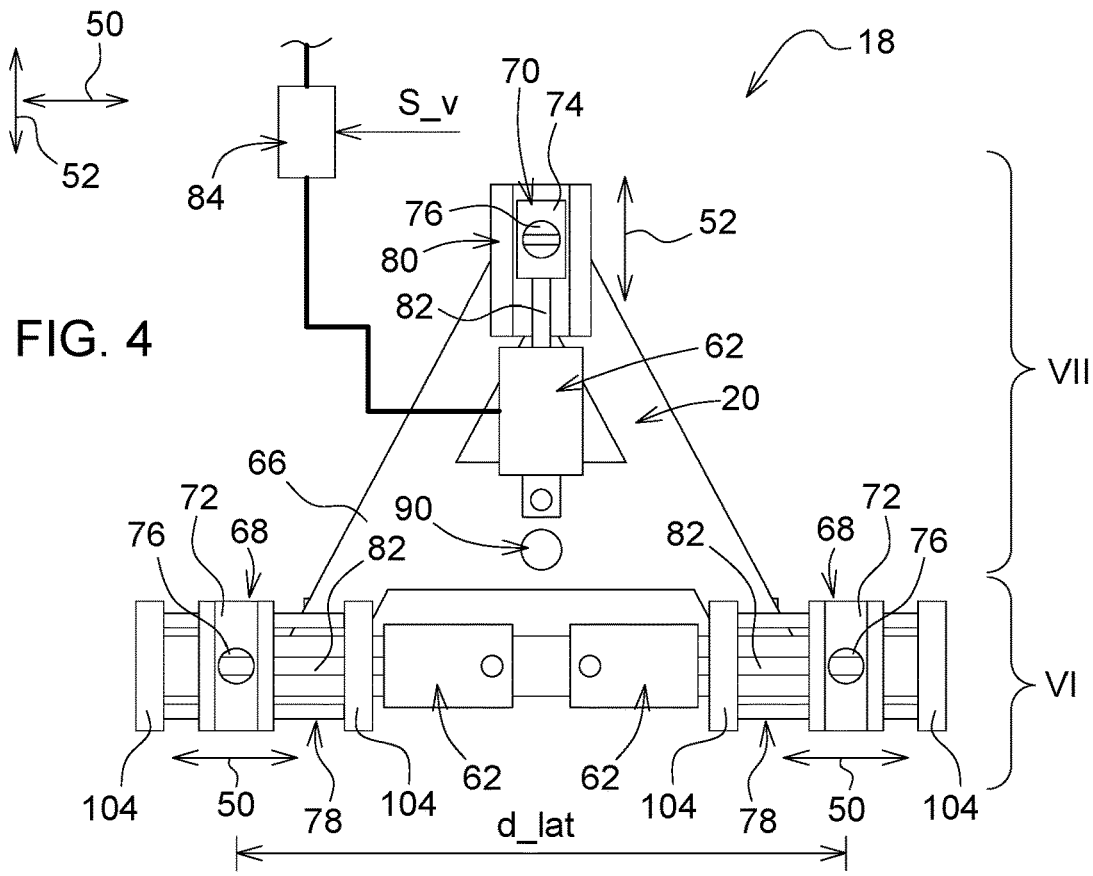
FIG. 4 shows a front view of the coupling device according to the present disclosure with a view of the link mounting region thereof.
Figure 5:
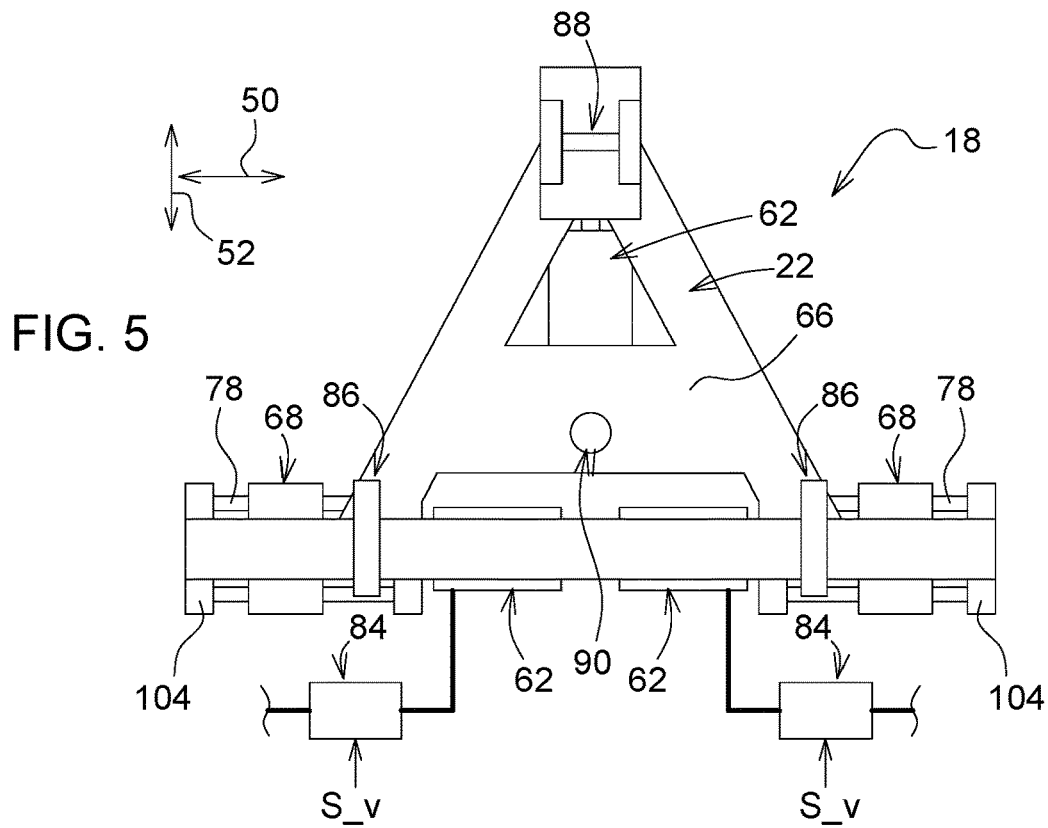
FIG. 5 shows a rear view of the coupling device according to FIG. 4 with a view of the apparatus mounting region thereof.

The coupling device 18 may be clearly identified in FIG. 4 and FIG. 5. The coupling device comprises a frame-like device base 66, different components to be described further being mounted or borne thereon.

The side of the coupling device 18 comprising the link mounting region 20 is visible in FIG. 4. The upper link 36 and the two lower links 32, 34 are articulated on this side. To this end, the link mounting region 20 has two coupling units 68 for the lower links 32, 34 and a coupling unit 70 for the upper link 36. The coupling units 68, 70 have in each case a slide 72, 74 which is movable in a translatory manner. Each slide 72, 74 bears a coupling joint 76, the coupling point 38, 38', 40 of the respective link 32, 34, 36 being articulated thereto. For example, the coupling joint 76 is configured in the manner of a ball joint and cooperates with an arresting hook as a coupling point 38, 38', 40 of the respective link 32, 34, 36. The slides 72, 74 are movably borne in a translatory manner on guide tracks 78, 80, which are fixedly connected to the device base 66. In this case, the two slides 72 and thus also the coupling units 68 are movable in a translatory manner in the transverse direction 50, while the slide 74 and thus also the coupling unit 70 are movable in a translatory manner in the vertical direction 52 running perpendicular to the transverse direction 50.

In FIG. 4, each coupling unit 68, 70 is connected to a separate drive unit 62. The drive units 62 are configured in each case as a hydraulic cylinder, the piston rod thereof 82 being connected to the respective slide 72, 74 and as a result driving said slide in terms of movement. The hydraulic drive unit 62 in turn is activated by adjustment signals S_v and a control valve 84, shown merely schematically. The control valves 84 are arranged on the coupling device 18 or on the tractor 16. Alternatively, individual drive units or all of the drive units 62 are configured non-hydraulically without the control valves 84. In this case, for example, the drive unit 62 is an electric motor with a control input for receiving adjustment signals S_v.

The drive units 62 are designed such that the coupling unit 70 assigned to the upper link 36, on the one hand, and the coupling units 68 assigned to the lower links 32, 34, on the other hand, are movable independently of one another. In FIG. 4, moreover, the two coupling units 68 assigned to the lower links 32, 34 are movable independently of one another.

While in FIG. 4, the two coupling units 68 assigned to the lower links 32, 34 are connected in each case to a drive unit 62. In the embodiment according to FIG. 5, both coupling units 68 are connected to a single, i.e., the same, drive unit 62. The two coupling units 68 are thus not movable independently of one another. Irrespective of the number or embodiment of the coupling units 68 assigned to the lower links 32, 34, the coupling units determine with one another the relative spacing d_lat running in the transverse direction 50. The relative spacing d_lat is altered by the corresponding translatory movements of a coupling unit 68 or both coupling units 68.

The side of the coupling device 18 comprising the apparatus mounting region 22 is visible in FIG. 5. A fixing of the respective attachment 14 to the apparatus mounting region 22 may be carried out by various fixing devices. For example, two arresting hooks 86 and a fastening point 88 are arranged on the apparatus mounting region 22, in order to achieve a direct or indirect mechanical connection with corresponding fixing points of the attachment 14. A further connecting piece, for example, in the manner of a link may also be provided between the fastening point 88 of the coupling device 18 and a corresponding fixing point of the attachment 14. In each case, irrespective of the embodiment of the fixing of the attachment 14 to the apparatus mounting region 22, the fixing effects a substantially rigid and releasable connection between the coupling device 18 and the attachment 14.

It may be derived from FIG. 4 and FIG. 5 that the device base 66 is penetrated by a circular recess 90. This recess may receive, for example, a shaft (in particular a power take-off shaft or a corresponding extension) for the transmission of force between the tractor 16 and the attachment 14.

Figure 6:
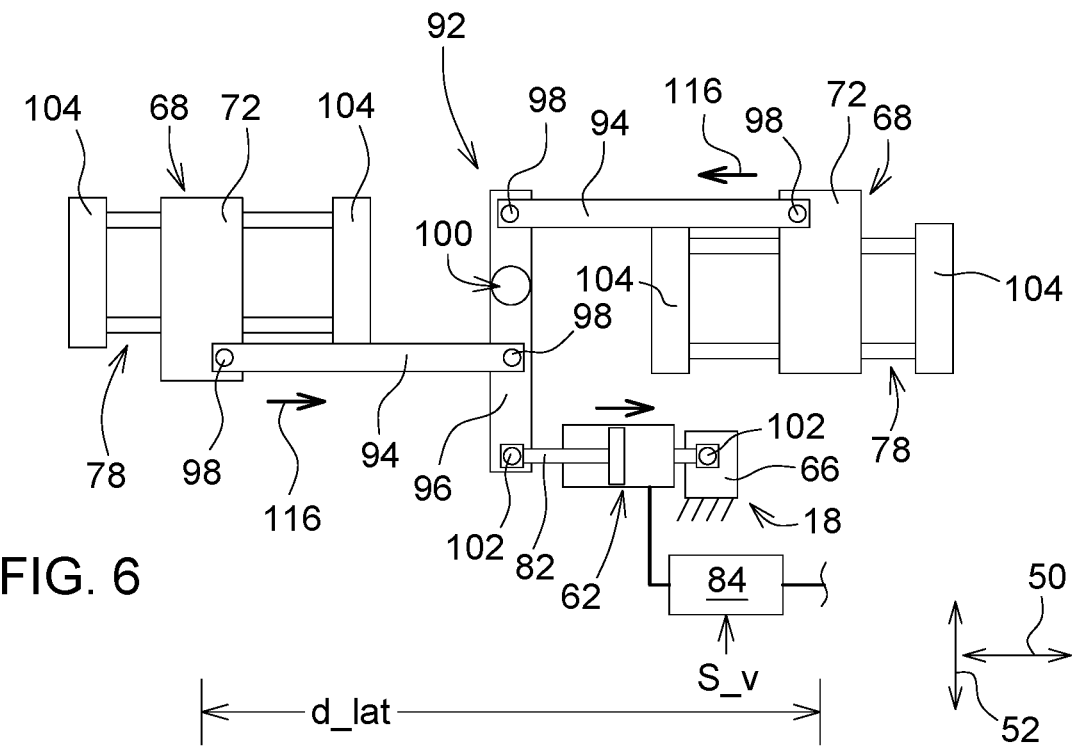
FIG. 6 shows an enlarged partial view, namely of the region VI in FIG. 4 in a further embodiment.

As already mentioned, in FIG. 6 the two coupling units 68 are connected to a common drive unit 62 via a lever structure 92. The slides 72 are in each case movably connected via a connecting crosspiece 94 to a connecting link 96, in particular by corresponding joint pins 98. The connecting link 96 is borne, in a manner not shown here in more detail, in an articulated manner on the coupling device 18 via a link pin 100. The drive unit 62 shown in FIG. 6 is movably connected via joint pins 102, on the one hand, to the connecting link 96 and, on the other hand, to the device base 66. If the piston rod 82, as indicated in FIG. 6, is driven to the right in the drawing plane, the two coupling units 68 are automatically moved toward one another as indicated by the arrow directions 116.

In further embodiments, the drive unit 62 according to FIG. 6 may be configured, for example, as an electric motor (i.e., a linear motor or stepper motor) which then drives the link pin 100, which at least in this embodiment is fixedly connected to the connecting link 96. In this case, the joint pin 102 on the connecting link 96 is superfluous.

Irrespective of their embodiment, the drive units 62 assigned to the lower links 32, 34 may be activated via the control unit 24 in order to alter the relative spacing d_lat. In this case, the translational mobility of the coupling units 68 is delimited by end stops 104 arranged on the guide tracks 78.

In the control unit 24 a target predetermined value V_soll, for example, in the form of a target value d_lat_soll, of the relative spacing d_lat may be predetermined in order to adjust the point of traction P_z and thus also the operating line AL1.

The respective relative spacing d_lat or a physical parameter (for example, path alteration) of this relative spacing d_lat is, for example, transmitted as a sensor signal S_sen to the control unit 24. In this case, a rotational speed sensor cooperating with the link pin 100 may be used for the sensor signals S_sen. The sensor signals S_sen may also contain information about the current position of the point of traction P_z since the position of the point of traction P_z depends on the relative spacing d_lat.

If the drive unit 62 and lever structure 92 according to FIG. 6, which are used, permit a mirror-symmetrical alteration of the relative position of both lower links 32, 34, in a specific embodiment the point of traction P_z may be adjusted only along the x-coordinate or only in the longitudinal direction 48. With a symmetrical arrangement of the lower links 32, 34 relative to a central longitudinal axis 106 of the tractor 16 and a uniform spacing of the two coupling points 108 of the lower links 32, 34 facing the tractor 16, to one another in the transverse direction 50, this means that the point of traction P_z is adjustable only along this central longitudinal axis 106 in the longitudinal direction 48. In this case, the position of the point of traction P_z in FIG. 8A corresponds to a large, in particular maximum, relative spacing d_lat. The position of the point of traction P_z in FIG. 8B corresponds to a small, in particular minimum, relative spacing d_lat.

In the case of an independent adjustment movement of both coupling units 68 such as, for example, according to FIG. 4, the point of traction P_z may be adjusted both with regard to its x-coordinate and its y-coordinate.

As already mentioned, the position of the pole point P_p is dependent on the position of the upper link 36 relative to one or both lower links 32, 34. In this case, it refers to the relative position in a vertical plane spanned by the longitudinal direction 48 and the vertical direction 52. This relative position may be altered by a variable position of the upper link 36 relative to the horizontal reference lines 42 running parallel to the longitudinal direction 48. To this end, the coupling point 40 of the upper link 36 is articulated to the coupling joint 76 of the coupling unit 70.

The control unit 24 may generate adjustment signals S_v by which the drive unit 62 of the coupling unit 70 may be activated. By this activation, the slide 74 may be moved in the vertical direction 52 between the upper position shown in FIG. 7 and a lower position inside the guide track 80. As a result, the vertical relative spacing d_ver between a joint axis 110 of the coupling joint 76 and the reference lines 42 arranged in FIG. 7, not to scale, may be altered continuously and automatically. The vertical relative spacing d_ver is at the greatest in the position of the coupling unit 70 according to FIG. 7.

Figure 7:
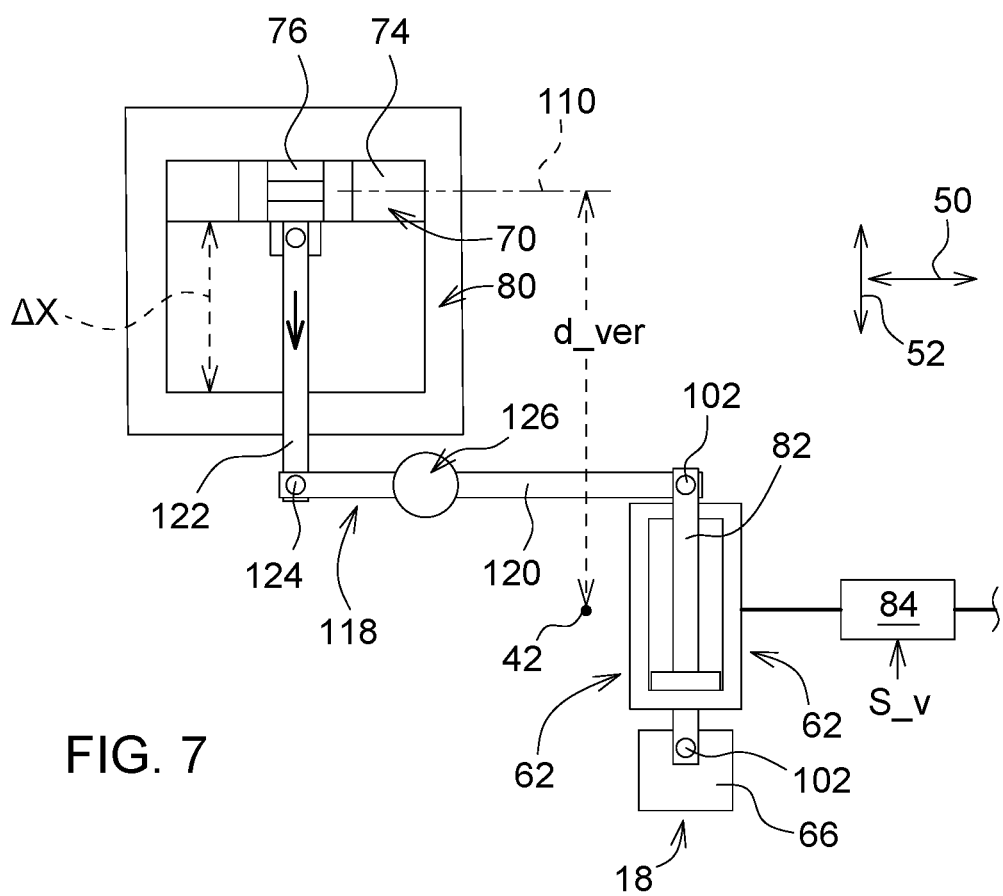
FIG. 7 shows an enlarged partial view, namely of the region VII in FIG. 4 in a further embodiment.

In FIG. 7 the coupling unit 70 is connected to the drive unit 62 via a lever structure 118. The lever structure 118 has a first articulated rod 120 and a second articulated rod 122 which are connected together in an articulated manner by a connecting pin 124. The first articulated rod 120 is pivotably borne on a deflection pin 126. If the piston rod 82, as indicated in FIG. 7, is driven upwardly in the drawing plane, this effects a control of the downward movement of the coupling unit 70 and vice-versa.

The respective vertical relative spacing d_ver or a physical parameter (for example path alteration) of this relative spacing d_ver, for example, is transmitted as a sensor signal S_sen to the control unit 24. For example, a path covered by the piston rod 82 in the vertical direction 52 may be detected. In FIG. 7 this parameter is symbolized as a maximum possible path alteration Δx. Alternatively, a rotational speed sensor cooperating with the deflection pin 126 may be used for the sensor signals S_sen. The sensor signals S_sen may also contain information about the current position of the pole point P_p since the position of the pole point P_p depends on the vertical relative spacing d_ver.

The adjustment of the pole point P_p due to an altered vertical relative spacing d_ver is able to be identified in FIG. 9A and FIG. 9B with reference to a supporting structure 112 of the tractor 16. In the case of a large, in particular maximum, relative spacing d_ver the pole point P_p is located in the vicinity of the rear axle 56, while in the case of a small, in particular minimum, relative spacing d_ver the pole point P_p has been adjusted in the longitudinal direction 48 by a distance 114 in the direction of the front axle 58. As a result, the x-coordinate and the z-coordinate of the pole point P_p are adjustable.

In the control unit 24, a target predetermined value V_soll, for example, in the form of a target value d_ver_soll of the relative spacing d_ver, may be predetermined in order to adjust the pole point P_p and thus also the operating line AL2.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A coupling device for attaching a power lift of a tractor to an attachment, comprising:
   a link mounting region having coupling units for the articulation of an upper link and two lower links of the power lift;
   an apparatus mounting region for fixing the attachment; and
   a coupling unit assigned to the upper link is movable in a translatory manner in a vertical direction running perpendicular to a transverse direction;
   wherein, the coupling units are movably disposed on a device base of the coupling device,
   wherein, the coupling units assigned to the two lower links are movable in a translatory manner in the transverse direction.

2. The coupling device of claim 1, wherein the use thereof for adjusting the position of a point of action selected from a point of traction as a geometric point of intersection of the imaginary extensions of both lower links or a pole point as a geometric point of intersection of the imaginary extensions of the upper link and a lower link.

3. The coupling device of claim 1, wherein the coupling units assigned to the two lower links are movable relative to one another in order to alter a relative spacing running in the transverse direction.

4. The coupling device of claim 1, wherein the coupling units assigned to the lower links are movable independently of one another.

5. The coupling device of claim 1, wherein the coupling unit assigned to the upper link and the coupling units assigned to the lower links are movable independently of one another.

6. The coupling device of claim 1, further comprising a coupling unit connected to a drive unit which is activated for a translatory movement of the coupling unit.

7. The coupling device of claim 6, wherein the coupling units assigned to the two lower links are connected to the same drive unit.

8. A control arrangement, comprising:
   a power lift of a tractor; and
   a coupling device for controlling the movement of the power lift, the coupling device comprising:
     a link mounting region having coupling units for the articulation of an upper link and two lower links of the power lift;
     an apparatus mounting region for fixing the attachment; and
     a coupling unit assigned to the upper link is movable in a translatory manner in a vertical direction running perpendicular to a transverse direction;
     wherein, the coupling units are movably disposed on a device base of the coupling device,
     wherein, the coupling units assigned to the two lower links are movable in a translatory manner in the transverse direction.

9. The control arrangement of claim 8, further comprising a control unit operably generating adjustment signals for setting a target spacing between an upper link and a lower link of the power lift, or a target spacing between two lower links of the power lift.

10. The control arrangement of claim 9, further comprising at least one drive unit of the coupling device activated by the adjustment signals for controlling the movement of the power lift.

11. The control arrangement of claim 9, wherein the control unit generates adjustment signals as a function of a target predetermined value.

12. The control arrangement of claim 9, wherein the control unit receives sensor signals from a sensor unit and generates adjustment signals as a function of received sensor signals.

13. The control arrangement of claim 12, wherein the sensor unit is arranged at least partially on the coupling device.

14. The control arrangement of claim 8, wherein the coupling units assigned to the two lower links are movable relative to one another in order to alter a relative spacing running in the transverse direction.

15. The control arrangement of claim 8, wherein the coupling units assigned to the lower links are movable independently of one another.

16. The control arrangement of claim 8, wherein the coupling unit assigned to the upper link and the coupling units assigned to the lower links are movable independently of one another.

17. The control arrangement of claim 8, wherein the coupling unit is connected to a drive unit which is activated for a translatory movement of the coupling unit.

18. The control arrangement of claim 17, wherein the coupling units assigned to the two lower links are connected to the same drive unit.

19. A coupling device for attaching a power lift of a tractor to an attachment, comprising:
   a link mounting region having coupling units for the articulation of an upper link and two lower links of the power lift;
   an apparatus mounting region for fixing the attachment;
   a coupling unit assigned to the upper link is movable in a translatory manner in a vertical direction running perpendicular to a transverse direction; and
   a drive unit operably activated for inducing translatory movement of the coupling unit;
   wherein, the coupling units are movably disposed on a device base of the coupling device,
   wherein, the coupling units assigned to the two lower links are movable in a translatory manner in the transverse direction.

20. The coupling device of claim 19, wherein the coupling units assigned to the two lower links are connected to the same drive unit.

* * * * *